United States Patent
Trochanowski et al.

[15] 3,671,964
[45] June 20, 1972

[54] AUTOMATIC RADAR DETECTION DEVICE

[72] Inventors: Andrew J. Trochanowski, La Mesa; Steven A. Wicks, San Diego, both of Calif.

[73] Assignee: The United States of America as represented by the Secretary of the Navy

[22] Filed: Oct. 30, 1970

[21] Appl. No.: 85,590

[52] U.S. Cl. ........................................... 343/18 E
[51] Int. Cl. .................................. H04k 3/00, G01s
[58] Field of Search ................................. 343/18 E

[56] References Cited

UNITED STATES PATENTS 2,522,551  9/1950  Williams .......................... 343/18 E X
3,500,401  3/1970  Miller et al. ......................... 343/18 E

*Primary Examiner*—T. H. Tubbesing
*Attorney*—R. S. Sciascia, George J. Rubens and J. W. McLaren

[57] ABSTRACT

A shipborne detector for indicating the presence or absence of "search-lighting" or continuous observation by hostile pulsed tracking radars wherein presence is indicated if the pulse rate of incoming radar pulses exceeds a selectively predetermined rate whereby a radar display is automatically activated and automatically blanked if the pulse rate does not exceed the predetermined rate.

4 Claims, 1 Drawing Figure

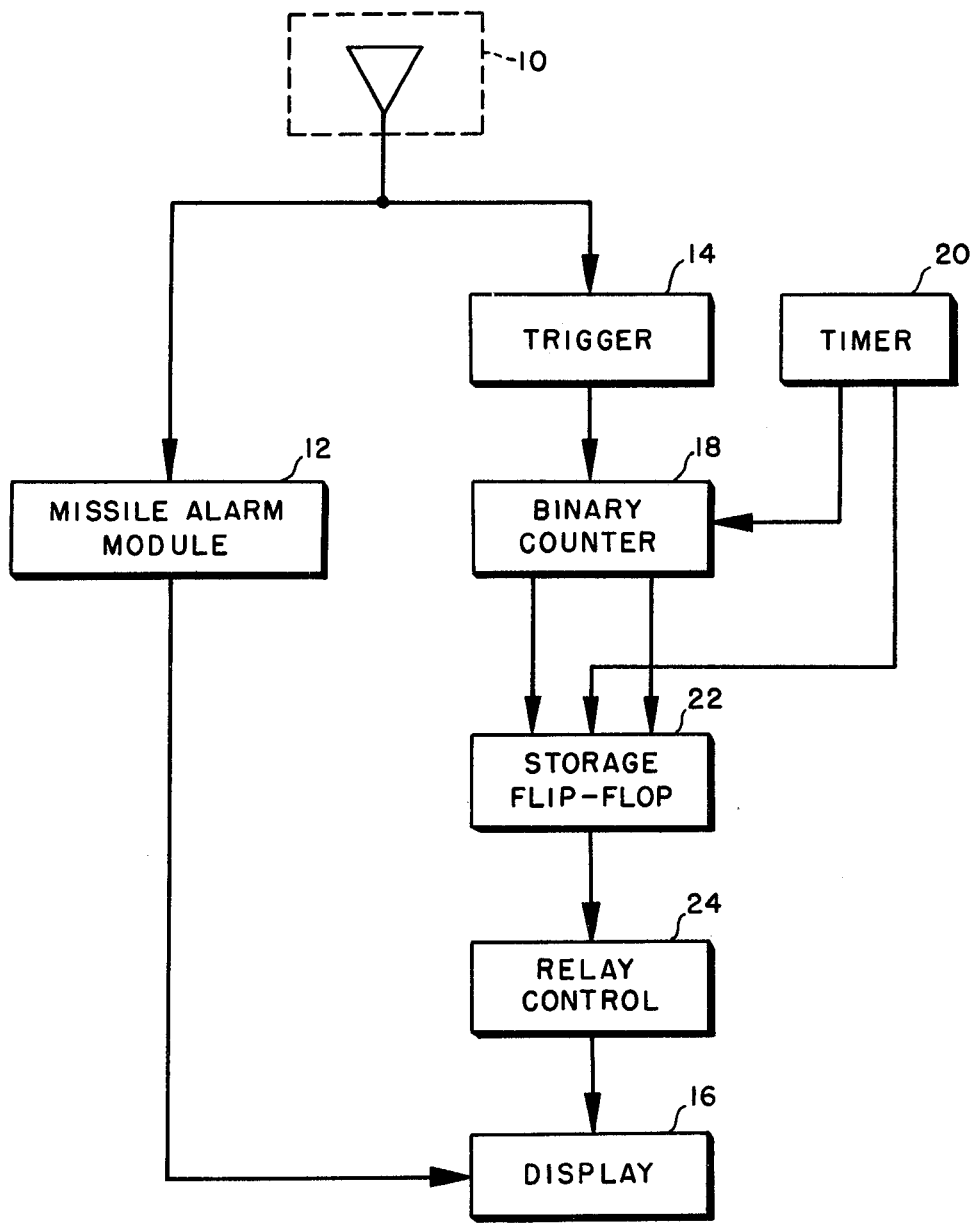

AUTOMATIC RADAR DETECTION DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

To provide effective defenses against anti-ship missile threats, shipboard EW systems must have relatively fast reaction times, especially where detection-to-impact times are in the order of a few minutes. One of the anti-ship missile defense functions of shipboard EW systems is to identify the condition of "search-lighting" or continuous observation by hostile radars since the condition often precedes an anti-ship missile attack. "Search-lighting" is now identified by various methods which require several personnel actions. These methods are not very reliable because the environment can be so severe or cluttered that recognition of specific signals by human observers can become impossible. Consequently the need for and the advantages of an automatic "search-lighting" detector become readily apparent.

SUMMARY

A shipborne detector for indicating the presence or absence of "search-lighting" by hostile pulsed tracking radars. Presence is indicated by the actuation of a display device only when the pulse rate of incoming pulses exceeds a selectively predetermined rate and absence is indicated by blanking of the display device when the rate is not achieved. Input pulses are periodically counted in a digital pulse rate counter for a selectively predetermined period of time. If the counter reaches a full count before the period ends, the counter produces a true output. When the period ends the output is shifted to a storage flip-flop. The counter is then reset by timing signals from a timer and another counting cycle or period is begun. When the storage stage is set a relay control connected to the display device is energized whereby the input radar pulses are displayed on the display device and the presence of "search-lighting" is indicated. If the counter does not reach a full count before the period ends, the counter produces a false output which does not set the storage flip-flop and consequently the display device is blanked.

OBJECTS OF THE INVENTION

The primary object of the present invention is to provide shipboard apparatus for automatically detecting the presence or absence of continuous observation by hostile pulsed radar systems.

Other objects, advantages and novel features of the invention will become apparent from the following detailed description of the invention when considered in conjunction with the accompanying drawing wherein:

BRIEF DESCRIPTION OF THE DRAWING

The single FIGURE is a simplified schematic block diagram of a missile alarm module and the novel automatic radar detection device disclosed herein.

DESCRIPTION OF THE PREFERRED EMBODIMENT

The single FIGURE represents a simplified schematic block diagram of a missile alarm module and an automatic radar detection device for indicating the presence or absence of "search-lighting" or continuous observation by hostile pulsed radar systems.

In the FIGURE, a direction finding antenna system 10 is shown connected at its output to a missile alarm module 12 and to a conventional trigger circuit 14. The missile alarm module is connected at its output to a radar display device 16 which can, for example, comprise a conventional vector display device. The trigger circuit 14 is connected to a binary counter 18. A timer circuit is operatively connected to the binary counter 18 and to a storage flip-flop 22 which is connected to the output of the counter 18. The flip-flop 22 is connected at its output to a relay control device 24 which is connected to the display device 16.

The missile alarm module 12 essentially comprises a shipboard, semi-automatic, threat-responsive device capable of performing significant filtering of hostile radars with respect to range and frequency in a dense environment. The module includes a direction finding antenna system consisting of a plurality of antennas. The output of each antenna in the system is separately filtered, video detected, and video amplified by means of conventional electronic circuits (not shown) in the antenna system.

In the module 12, video processing circuits perform logical operations on the outputs from the antennas to produce $x$ and $y$ vector outputs which contain direction information in their relative amplitudes. The output of both the $x$ and $y$ channels are then coupled to a "sample and hold" circuit which in effect provides pulse stretching. The stretched pulses are then integrated to provide a saw-tooth waveform for the $x$- and $y$-axes of the display device 16.

The above circuits described as comprising the missile-alarm module are not shown in the FIGURE because it is the over-all function of the module which is relevant to the description of the automatic radar detection device which follows.

As previously mentioned, to be threat-responsive in a dense environment, the number of undesired radar signals reaching the module 12 must be substantially reduced. In essence, this filtering of unwanted radar signals is the function of the automatic radar detection device of the FIGURE. That is, the device functions in the following manner to cut off or blank the display device 16 until a predetermined number of radar pulses are received within a selectively predetermined period of time, i.e., a predetermined pulse rate, and to activate the display device only while radar pulses are received at that pulse rate.

Incoming radar pulses are applied simultaneously to the trigger circuit 14 and the module 12. The trigger circuit 14 removes fluctuations present in the input pulses and produces constant amplitude pulses which are coupled directly to a binary counter 18.

The input pulses are counted periodically in the binary counter 18 for a selectively predetermined period of time provided by a conventional timer 20. For example, assume that a pulse-rate of 600 pulses per second constitutes "search-lighting" by a particular hostile radar. If a a time period equal to 1.7 seconds is arbitrarily selected, then the counter 18 must count at least 1,024 pulses in that time period before the relay control 24 is energized to thereby provide a radar display on the display device 16.

Once the full count of 1,024 pulses is achieved before the time period ends, a storage flip-flop circuit (not shown) in the binary counter 18 is set to an "on" condition, i.e., it stores the count. When the period ends, the timer 20 simultaneously provides a reset signal to the counter 18 and a shift signal to the storage flip-flop 22. The shift signal shifts or transfers the "true" output (e.g., a logical "one") of the counter 18 to the storage flip-flop 22 thereby setting it to an "on" condition; and the reset signal automatically resets the counter and another 1.7 second pulse counting cycle is initiated.

The storage flip-flop 22, when set to an "on" state by the "true" output from the counter 18, feeds its output to the relay control 24 thereby energizing the relay control. The output of the relay control then activates the display device 16 whereby incoming radar pulses are displayed thereon and "search-lighting" by a hostile pulsed radar is indicated.

If a full count is not achieved by the counter 18 during a 1.7 second time period, the counter produces a "false" output (e.g., a logical "0") and upon receipt of a reset signal from the timer 20, another counting cycle or period is initiated. The storage flip-flop 22 is not set and consequently the relay control 24 is not activated and the display device 16 is blanked.

Thus it can be seen that a new and novel shipboard radar detection device for blanking a radar display device until a selectively predetermined radar pulse rate is achieved has been disclosed whereby unwanted or undesirable radar signals are not displayed. The device comprises a relatively simple and effective circuit which automatically indicates "search-lighting" by hostile pulse radars.

Obviously many modifications and variations of the present invention are possible in the light of the above teachings. It is therefore to be understood that within the scope of the appended claims the invention may be practiced otherwise than as specifically described.

What is claimed is:

1. Apparatus for selectively energizing an EW display device whereby hostile radar pulses are displayed only when said pulses are received at a selectively predetermined pulse rate, said apparatus comprising:
   directional antenna means for receiving and detecting said radar pulses;
   pulse rate counter means connected to said antenna means for repetitively counting the number of radar pulses received during a fixed time period whereby said counter means produce a true output if a selectively predetermined number of radar pulses are received and a false output if less than said number are received; and,
   switching means connected to said pulse rate counter means and being responsive to said true output to thereby energize said display device and to said false output to thereby blank said display device.

2. The apparatus of claim 1 wherein said pulse rate counter means include binary counter means and timer means.

3. The apparatus of claim 1 wherein said switching means include storage flip-flop means and relay control means.

4. A radar detector for automatically indicating on an EW display device the presence of search-lighting by hostile tracking radars comprising:
   directional antenna means for receiving radar pulses transmitted by said hostile radars;
   binary counter means connected to said antenna means for counting said radar pulses;
   timer means connected to said counter means;
   said counter means being responsive to periodic timing signals from said timer means to thereby periodically count the number of said radar pulses received during a fixed time period;
   whereby said counter means produce a true output only if a selectively predetermined radar pulse count is achieved or exceeded during said time period and produce a false output if said predetermined radar pulse count is not achieved during said time period;
   switch means connected to said counter means and to said display device;
   said switch means being responsive to said true output to energize said display device whereby received radar pulses are displayed and being responsive to said false output to blank said display device whereby no received radar signals are displayed.

* * * * *